(12) United States Patent
Schach

(10) Patent No.: US 9,994,044 B2
(45) Date of Patent: Jun. 12, 2018

(54) HOLD AND CENTERING DEVICE, CONTAINER TREATMENT DEVICE AND METHOD FOR TREATING CONTAINERS

(71) Applicant: KHS GmbH, Dortmund (DE)

(72) Inventor: Martin Schach, Bochum (DE)

(73) Assignee: KHS GmbH, Dortmund (DE)

( * ) Notice: Subject to any disclaimer, the term of this patent is extended or adjusted under 35 U.S.C. 154(b) by 0 days. days.

(21) Appl. No.: 15/309,874

(22) PCT Filed: Apr. 27, 2015

(86) PCT No.: PCT/EP2015/059081
§ 371 (c)(1),
(2) Date: Nov. 9, 2016

(87) PCT Pub. No.: WO2015/169631
PCT Pub. Date: Nov. 12, 2015

(65) Prior Publication Data
US 2017/0266982 A1   Sep. 21, 2017

(30) Foreign Application Priority Data

May 9, 2014   (DE) .................. 10 2014 106 573

(51) Int. Cl.
*B65G 47/22* (2006.01)
*B65G 17/32* (2006.01)
*B41J 3/407* (2006.01)

(52) U.S. Cl.
CPC .......... *B41J 3/4073* (2013.01); *B65G 17/323* (2013.01); *B65G 47/22* (2013.01)

(58) Field of Classification Search
CPC ...... B65G 47/22; B65G 47/24; B65G 47/244; B65G 47/842; B65G 47/843; B65G 47/847; B65G 47/848; B65G 43/54; B65B 43/42
See application file for complete search history.

(56) References Cited

U.S. PATENT DOCUMENTS

| | | | | |
|---|---|---|---|---|
| 6,279,722 | B1* | 8/2001 | Bankuty | B65C 9/065 198/377.1 |
| 8,439,181 | B2* | 5/2013 | Hausladen | B08B 9/426 198/470.1 |
| 2011/0272255 | A1* | 11/2011 | Fahldieck | B08B 9/32 198/803.3 |
| 2012/0031730 | A1* | 2/2012 | Breil | B21D 43/14 198/348 |
| 2014/0223857 | A1* | 8/2014 | Schach | B41J 3/4073 53/131.2 |

FOREIGN PATENT DOCUMENTS

| | | |
|---|---|---|
| DE | 41 31 327 | 3/1993 |
| DE | 20 2006 000 270 | 4/2006 |
| DE | 10 2009 003 478 | 8/2010 |

(Continued)

*Primary Examiner* — Mark A Deuble
(74) *Attorney, Agent, or Firm* — Occhiuti & Rohlicek LLP

(57) ABSTRACT

A holding-and-centering device for holding and centering a container has fixing section and holding-sections on opposite sides of the fixing section. The fixing section fixes the holding-and-centering device to a structure of a container-treatment machine but is also detachable from that structure. Each holding section picks up and holds a corresponding container.

20 Claims, 3 Drawing Sheets

(56) References Cited

FOREIGN PATENT DOCUMENTS

| | | | |
|---|---|---|---|
| DE | 10 2009 043497 | 3/2011 | |
| DE | 10 2011 009 391 | 7/2012 | |
| DE | 102011112106 B3 * | 2/2013 | ............ B41J 3/4073 |
| DE | 10 2011 122 910 | 4/2013 | |
| WO | WO2013/029710 | 3/2013 | |
| WO | WO2013/029712 | 3/2013 | |

* cited by examiner

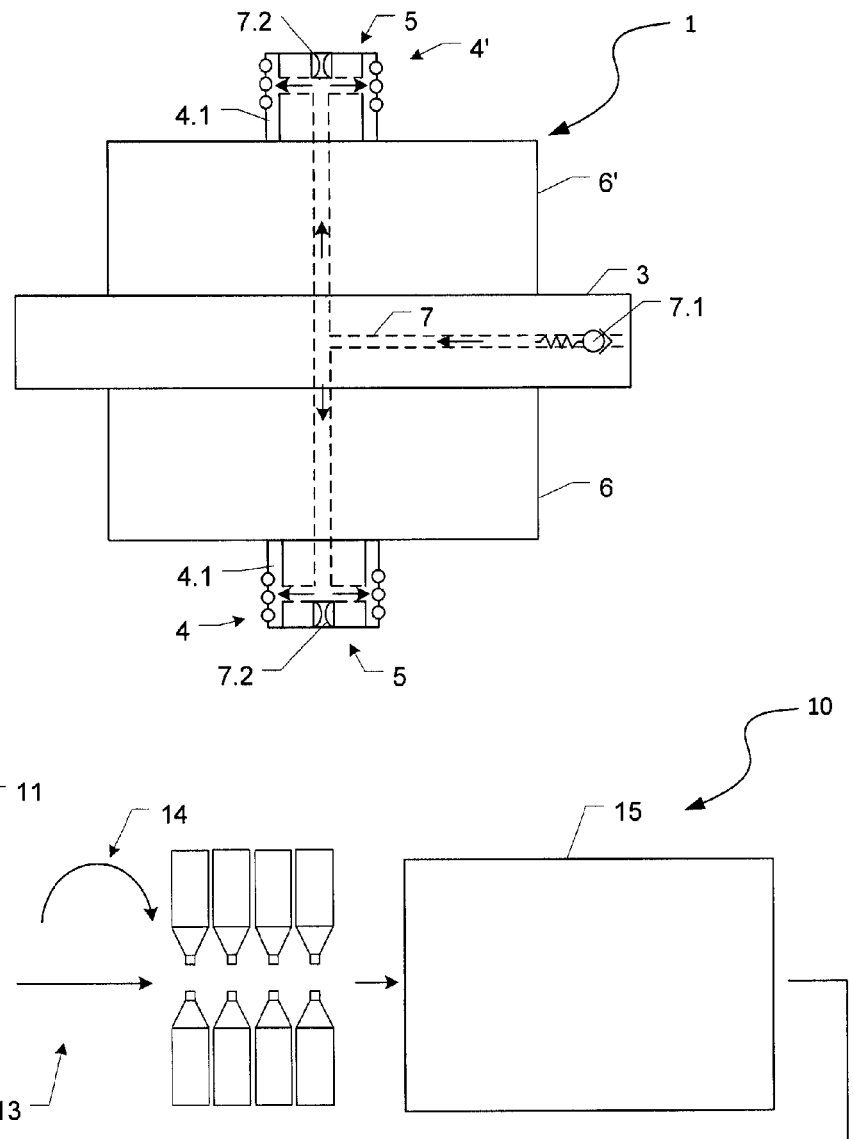

HOLD AND CENTERING DEVICE,
CONTAINER TREATMENT DEVICE AND
METHOD FOR TREATING CONTAINERS

RELATED APPLICATIONS

This is the national stage under 35 USC 371 of international application PCT/EP2015/059081, filed Apr. 27, 2015, which claims the benefit of the May 9, 2014 priority date of German application DE 102014106573.5, the contents of which are herein incorporated by reference.

FIELD OF INVENTION

The invention relates to container treatment, and in particular, to a holding-and-centering device for handling containers to be treated.

BACKGROUND

In certain known container-treatment machines, a puck holds containers over the entire transport path, from a container inlet, through possibly a plurality of treatment machines, and as far as a container outlet. The puck only releases the containers at the container outlet. At the container outlet, the puck is then returned to the container inlet over a puck-return transport path.

Also known are printing systems for printing containers. These include inkjet printers. Known printing stations receive a container that is to be printed upon via a transport element that driven to rotate about at least one vertical axis.

SUMMARY

On this basis it is an object of the invention to provide a container-treatment device that promotes a greater machine output.

According to a first aspect, the invention features a holding-and-centering device for containers. The holding-and-centering device comprises at least one fixing section and two holding sections. The holding-and-centering device can be fixed by the fixing section to a transport element of a container-treatment machine or to means provided thereon for treating the containers, for example a treatment station, and in particular a printing segment. At the treatment station, the fixing section can be engaged, for example, in a pick-up section configured with a complementary shape and detachably mounted in this pick-up section. The holding sections are each configured to pick up and hold a container that is to be treated, for example by way of clamping, chucking, clasping or vacuum-suctioning a container section. The holding-and-centering device comprises two holding sections disposed so as to lie opposite one another. These fix a container to be treated can be fixed. The holding sections are configured so as to fix or hold the containers by the container mouth region, for example.

The holding-and-centering device makes it possible for two containers to be held simultaneously at a treatment station and to be fixed accurately in position relative to means for treating the container, for example, print heads. This significantly increases machine output without any great increase in the machine's footprint because two containers can be treated at a treatment station at the same time.

According to one embodiment, the fixing section is disposed between the two opposing holding sections. As a result, the holding-and-centering device is held centrally between the holding sections on the transport element or the treatment station that is provided there. This produces a symmetrical, and in particular, a mirror-symmetrical, arrangement of the two containers at the holding-and-centering device. This, n turn, has a beneficial effect on the weight distribution and rotational maneuverability of the containers at the treatment station.

In a further embodiment, the holding sections are configured so that they hold a pair of containers to be treated in such a way that the container mouths of the containers of the pair of containers face one another. In other words, the containers that are held on the holding-and-centering device are also arranged mirror-symmetrically relative to a median plane, i.e. they are aligned normally to the vertical container axes. In particular, during container treatment at the treatment station, a first container of the pair of containers is held in the normal position, i.e. with its base region pointing down, whereas a further container is held in the inverted position, i.e. with its mouth region pointing down. A space-saving and throughput-optimized container treatment is achieved in this way because two axially offset treatment devices, e.g. print heads, which can simultaneously perform a container treatment, can be provided at one treatment station.

In a further embodiment, the holding sections are grippers. In this embodiment, containers can, for example, be held in such a way that the container lies with its container mouth up against a contact element or clamping piece with the container being at least partially encompassed on a radially projecting protrusion by a gripping element so that the container is clamped between the clamping piece and the gripping element. The protrusion can, in particular, be a neck ring of the container, in which case the gripping element is a neck-ring gripper.

Alternatively the holding sections are configured so they can be pushed, at least by a section, into the interior of the container in the mouth region. As a result, the container can be held just by being pushed onto the holding section and, if necessary, braced on its internal periphery.

In a further embodiment, the holding sections comprise a clamping device for holding the container clamped in its mouth region. Clamping can be effected on the external periphery by encompassing the exterior of the mouth region and subsequently clamping by pressing clamping means against the external periphery of the container wall in the mouth region. Alternatively, it is possible, with a holding section pushed into the interior of the container in the mouth region, for clamping to be effected by a clamping device that has clamping means pressed against the container wall from its inside. As a result, containers to be treated can be fixed exactly in position by the holding-and-centering device and so undergo optimized container treatment. This is particularly important when containers are to be printed upon. Under those circumstances, the position of the container relative to the print head has a significant impact on the quality of the printed image.

In a further embodiment, the holding sections are configured in such a way that, after a section of the holding section has been pushed into the mouth region of the container, a fixing of the container is brought about by clamping means that are moved radially outward to apply a pressure to the internal periphery of the container wall. The clamping means can be formed, for example, by a plurality of balls provided, for example, in multiple rows on the respective holding section. As a result of the radial mobility of the clamping means, with the clamping means radially retracted, the container can be pushed onto the holding section. Clamping can then be effected by moving the clamping means radially outward and so bringing about the clamped holding of the container relative to the holding-and-centering device.

The clamping device can be spring-loaded or operated by a fluid, in particular pneumatically. In some embodiments, the clamping means is pre-tensioned by one or more spring elements in a position that is directed radially outward and then, when the container is pushed onto the holding section, pressed back radially inward until the container mouth can be fitted onto the holding section. In this case, the spring-loaded pressing of the clamping means against the container wall causes the clamping.

Alternatively, compressed air can move the clamping elements to a radially external position. For example, the clamping means can partly project into a chamber to which compressed air can be applied, and then, when compressed air is applied to this chamber can be moved radially outward so as to clamp on the container wall. As one example, a form-fitting mandrel can engage an unfilled beverage, after which, aspiration of the mandrel by a vacuum will hold the can exactly in position.

In some embodiments, the holding sections are held so that they can rotate relative to the fixing section. This ensures that the containers that are fixed at the holding sections can be rotated relative to a treatment station, e.g. a printing station, provided at the transport element. As a result, the container can be printed upon peripherally while the print head remains stationary. This promotes high-quality printing.

In some embodiments, the axes of rotation of the holding sections coincide with a common axis of rotation. This ensures that the vertical container axes of the containers held at the holding sections also coincide with a common axis. This configuration saves considerable space when treating a pair of containers at a treatment station.

In some embodiments, the two holding sections are driven together. This means that the holding sections are coupled to one another for driving and are rotated together synchronously about an axis of rotation. As a result, a single drive-unit can rotate both holding sections. The two holding sections are alternatively driven independently of one another. This allows a separate orientation of the container relative to a treatment station to be advantageously carried out. It also allows the container to be rotated relative to the treatment station independently of the other container of the pair of containers.

The holding sections are preferably driven by one or more electromagnetic direct drives, each having a rotor section that is coupled to the holding section, thus forming the rotor of the electromagnetic direct drive. This enables a single rotor section to be associated with both holding sections. Alternatively, these two holding sections can be coupled to a single rotor section so that both holding sections are rotated when the rotor section rotates.

Alternatively, each holding section can be associated with a dedicated rotor section, in which case the rotor sections can be rotated independently of one another. In some embodiments, the rotor section comprises a plurality of peripherally arranged permanent magnets that, together with a stator coil disposed at the treatment station, form the electromagnetic direct drive. This results in a space-saving container drive.

Some embodiments also include a mechanism for applying pressurized fluid to the container's interior. Thin-walled containers in particular, such as PET bottles, have minimal stability. Even slight distortions of the container during container treatment can adversely affect the treatment result. Applying a pressurized fluid to the interior of the container to be treated ensures that the container acquires greater stability. This can significantly improve the treatment result, and in particular the quality of the container printing.

According to a further aspect, the invention is directed to a container treatment device that has a container transport path on which the containers to be treated are moved in a transport direction from a container inlet to a container outlet. The container transport path is formed by at least one transport and treatment element that can be driven to rotate about a vertical machine axis and that comprises a plurality of treatment stations configured on the transport element.

In some embodiments, the device is modular. Among these are embodiments that have successive and immediately contiguous transport and treatment elements. The device uses holding-and-centering units for holding, centering, aligning, and/or moving containers at the treatment stations during the treatment. The holding-and-centering units are held detachably at the treatment stations like a transport puck so as to facilitate a transfer of the respective holding-and-centering unit together with the containers that are provided on it from one transport and treatment element to the next transport and treatment element. In other words, at the beginning of the container treatment, a container is arranged at a holding-and-centering device. It then passes through a plurality of transport-and-treatment elements, all the while attached to that same holding-and-centering device. The holding-and-centering devices each comprise two holding sections arranged lying opposite one another, with each holding section being configured to hold one of two containers to be treated.

As a result, the container-treatment device ensures that two containers are held by the holding-and-centering unit and treated at a treatment station simultaneously. This significantly increases machine output without any great increase in the machine's footprint.

In a preferred embodiment, a feeding apparatus for feeding containers that are to be treated comprises a swivel mechanism for engaging a part of the container and swiveling that container about an axis running perpendicular to its vertical container axis. The feeding apparatus is configured in such a way that pairs of containers are fed to the holding-and-centering devices with their mouth regions facing each other. This can be achieved, for example, by feeding the containers to the treatment device in at least two rows via two transport star wheels, with one transport star wheel being configured to turn containers in the first row upside-down and another transport star wheel being configured to feed containers in the second row so that they remain unturned.

In an alternative embodiment, during the parallel movement in the transport direction, the holding-and-centering element is introduced by being lowered into the one container while the other container is brought up via a separate transport star wheel with a turning function. Upward movement of the holding-and-centering element then results in transfer of the turned container. An analogous discharge of the containers is provided at the outlet of the treatment device.

In this way, containers that are arranged on the same axis of rotation but mirror-symmetrically, for example, with one container in an inverted position with its mouth region pointing down and another container in a normal position with its container base at the bottom, are held together on one holding-and-centering device. As a result, both containers of the pair of containers can be held at their respective mouth regions. This is an advantage because it guarantees exact holding of the containers in a region in which no printing would take place anyway.

In another aspect, the invention features a method for treating containers in which the containers to be treated are conveyed along a container transport path from a container inlet to a container outlet, with the container transport path having at least one transport-and-treatment element that can be driven to rotate about a vertical machine axis and that comprises a plurality of treatment stations having holding-and-centering units for holding, centering, aligning, and/or moving the packaging media at the treatment stations during the treatment. The holding-and-centering devices each comprise two holding sections arranged lying opposite one another. Each holding-and-centering device holds two containers to be treated so that they lie opposite one another.

As used herein, "container" includes bottles and cans.

As used herein, "container-treatment machine" means any a machine that treats containers, including a printing machine and a labeling machine.

As used herein, "container treatment" is understood, in particular, to refer to decorating containers, for example by printing on them or labeling them.

As used herein, "substantially" and "around" refer to variations from a respective exact value by ±10%, preferably by ±5%, and/or variations in the form of changes that are insignificant for the function.

Further embodiments, advantages, and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

These and other features of the invention will be apparent from the following detailed description and the accompanying figures, in which:

FIG. 3 shows a detailed view of the holding-and-centering device of FIG. 2;

FIG. 4 shows a schematic view of a container treatment device; and

DETAILED DESCRIPTION

Figure 1:
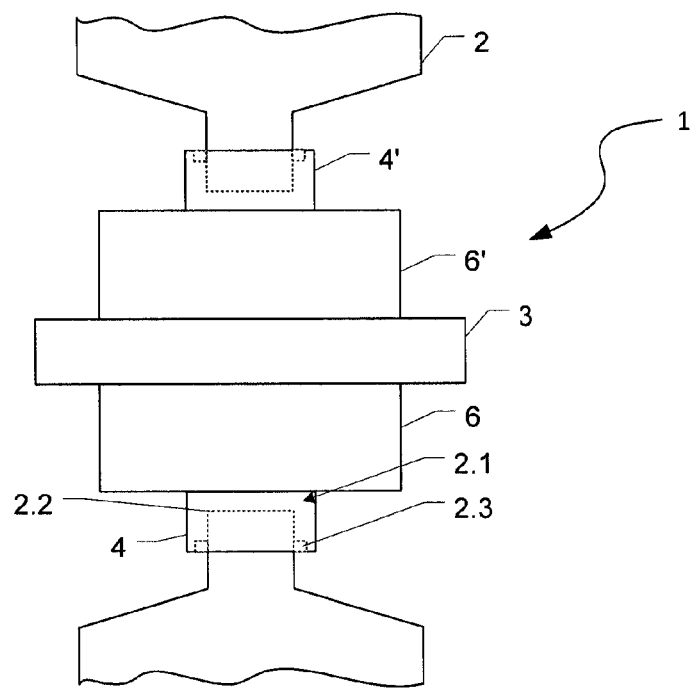
FIG. 1 shows a schematic side view of a holding-and-centering device with two containers arranged on it according to a first embodiment.

FIG. 1 shows a holding-and-centering device 1 used to hold and fix containers 2 during treatment thereof. In the particular example described herein, container treatment includes printing directly on the container 2 using an inkjet print head. However, the apparatus and methods described herein are applicable to other forms of container treatment.

Figure 5:
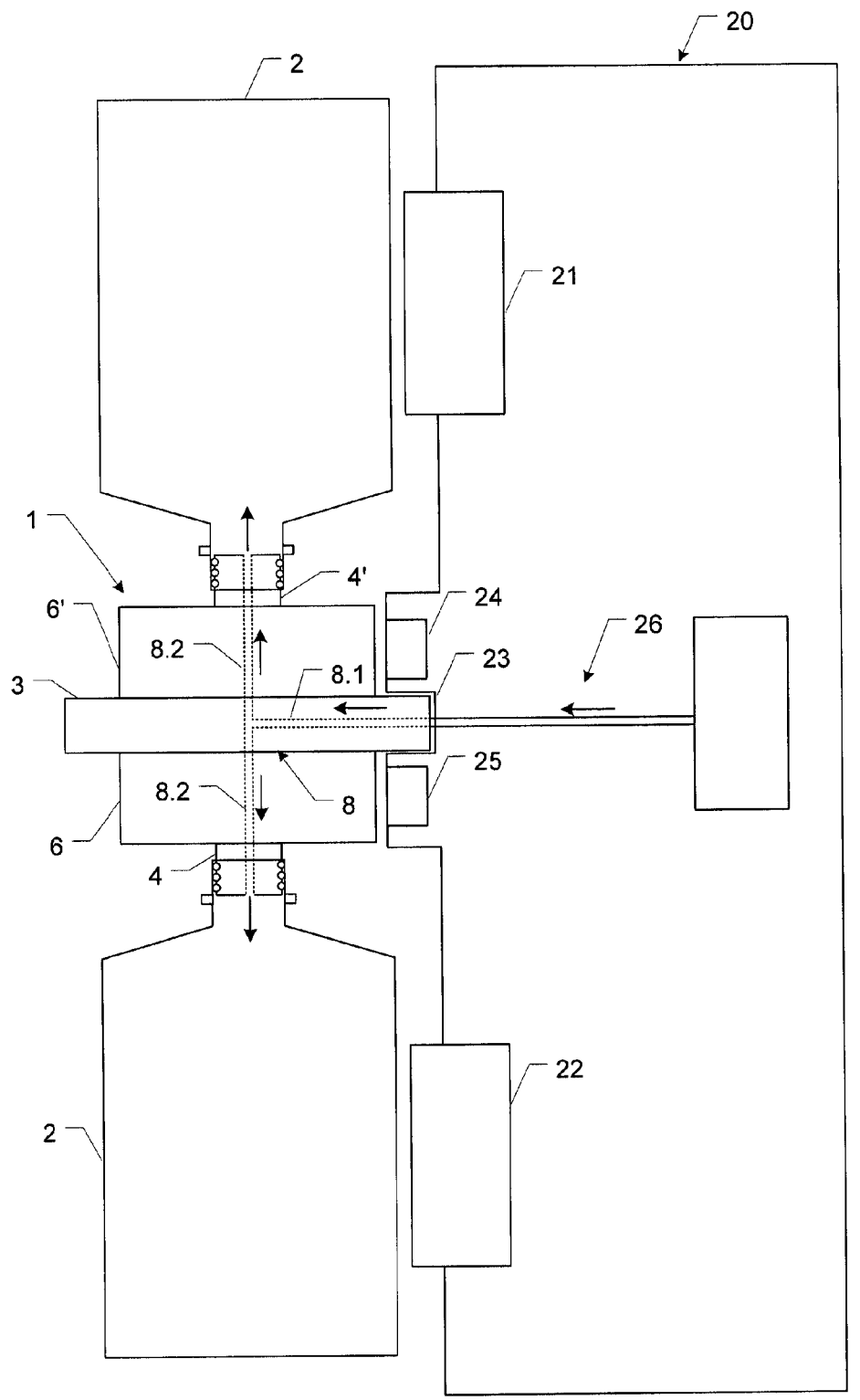
FIG. 5 shows a schematic sectional view of a printing segment with a holding-and-centering device arranged on it.

The holding-and-centering device 1 includes a fixing section 3. This fixing section 3 enables the holding-and-centering device 1 to be fixed relative to a transport element of a container treatment machine or to a treatment station that is provided on a transport element of a container treatment machine. An example of such a treatment station is a printing segment 20 as shown in FIG. 5.

The fixing section 3 has a circular cross-section that projects radially outward relative to the other sections, and in particular, relative to those sections of the holding-and-centering device 1 that are above and below the fixing section 3. As a result, upon engaging a pick-up section 23 configured with a complementary shape and provided at a treatment station, as shown in FIG. 5, the holding-and-centering device 1 accurately fixes its position relative to that treatment station or whatever on that treatment station will be used to treat containers 2, such as one or more print heads. In some embodiments, the holding-and-centering device 1 uses an electromagnetic force to hold itself at the transport element or treatment station.

The holding-and-centering device 1 comprises first and second holding sections 4, 4' for holding or fixing containers 2 relative to itself. The first and second holding sections 4, 4' lie at opposite free ends of the holding-and-centering device 1.

In some embodiments, the first and second holding sections 4, 4' hold the containers 2 in the regions of their container mouth 2.1. The holding-and-centering device 1 is particularly configured to hold a pair of containers 2 in such a way that the containers' respective vertical container axes are coaxial with the holding-and-centering device 1. In one embodiment, the first holding section 4 suspends a first container downward, while the second holding section 4' holds a second container upside-down so that it lies with the container mouth 2.2 held pointing downward. As a result, the two containers lie opposite each other with their respective container mouths facing each other across the fixing section 3.

The holding-and-centering device 1 also comprises one or more rotor sections 6. The particular embodiment shown in FIG. 1 has first and second rotor sections 6, 6' that rotate the first and second holding sections 4, 4', thereby rotating the two containers.

In some embodiments, the first and second rotor sections 6, 6' and the first and second holding sections 4, 4' are permanently interconnected sections that are mounted so as to be able to rotate relative to the fixing section 3. As a result, the containers held at the holding-and-centering device 1 rotate together relative to the fixing section 3.

In other embodiments, the first and second holding sections 4, 4' and their associated first and second rotor sections 6, 6' are mounted so as to be able to rotate independently of one another relative to the fixing section 3. As a result, the two containers rotate independently of one another relative to the fixing section 3.

In some embodiments, the fixing section 3 forms a fixed primary-part. The first and second holding sections 4, 4' and the corresponding first and second rotor sections 6, 6' are components of a secondary part that is mounted so as to be able to rotate relative to the fixed primary-part.

In other embodiments, the first holding-section 4 and its associated first rotor-section 6 form a first secondary-part while the second holding-section 4' and its associated second rotor-section 6' form a second secondary-part, with the first and second secondary-parts being able to rotate relative to the fixing section 3, i.e. the primary part, independently of one another.

During container treatment, the first and second rotor sections 6, 6' rotate the corresponding first and second containers about their respective vertical container axes. This rotation allows the containers to be printed upon all over their respective outer surfaces.

In some embodiments, the first and second rotor sections 6, 6' each form the rotor of an electromagnetic direct drive. In such embodiments, each of the first and second rotor sections 6, 6' includes peripherally arranged permanent magnets. These permanent magnets interact with a stator coil provided on the transport element to form an electromagnetic direct-drive that rotates a container 2. In this way, the first and second holding sections 4, 4' can be driven to rotate together or independently of one another by the first and second rotor sections 6, 6'.

A variety of mechanisms are available to hold containers 2 at the holding-and-centering device 1. In the embodiment shown in FIG. 1, the container has a mouth region 2.1 that includes a container mouth 2.2 and a protrusion 2.3. An example of a protrusion 2.3 is the container's neck ring. In this embodiment, a clamp 5 that is brought into contact with the container's mouth generates a tightening force on a gripping section thereof. This gripping section engages behind the protrusion 2.3.

Figure 2:
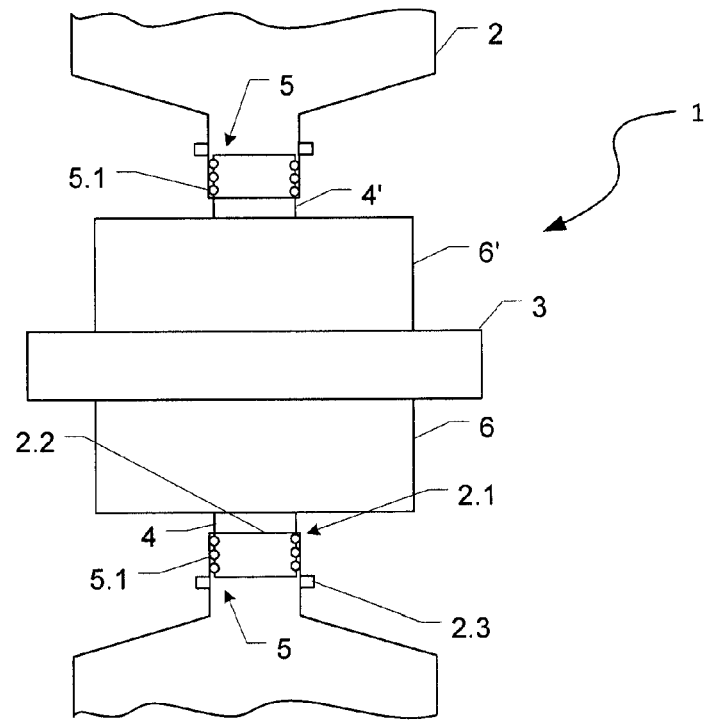
FIG. 2 shows a side view of a holding-and-centering device with two containers arranged on it according to a second embodiment.

FIG. 2 shows an alternative embodiment in which the first and second holding sections 4, 4' are at least partially pushed into the container's interior through its mouth region 2.1. In this embodiment, each of the first and second holding sections 4, 4' has a clamp 5 that clamps the container 2 at the mouth region 2.1 thereof.

In the particular embodiment shown, the clamp 5 of the first holding section 4 includes radially-displaceable balls 5.1 distributed in rows around the periphery of the first holding section 4. These rows are displaced relative to each other along the container's vertical axis. As a result of their being radially displaceable, when the first holding section 4 is pushed into the mouth region 2.1, the balls 5.1 press up against the inner face of the container's wall in its mouth region. This fixes the container 2 relative to the first holding section 4.

The clamping mechanism associated with the second holding section 4' is identical to that associated with the first holding section 4.

In some embodiments, a spring urges the radially-displaceable balls 5.1 radially outward. When a holding section 4, 4' is introduced into the mouth region 2.1, the balls 5.1 are least partly pushed inwards. The spring's restoring force thus results in a clamping force.

In an alternative embodiment, a pressurized-fluid drive can be used to urge the radially-displaceable balls 5.1 from an at least partly retracted position into an advanced position. In some embodiments, the pressurized fluid is a gas, so that the pressurized-fluid drive is a pneumatic drive.

The fixing section 3 and the rotor sections 6, 6' include channels for applying increased internal pressure to the containers. FIG. 3 shows a sectional view of the holding-and-centering device 1 in which compressed air or a vacuum actuates the clamp 5.

A channel system 7 in the holding-and-centering device 1 supplies compressed or aspirated air from the fixing section 3 to the holding sections 4, 4'. The channel system 7 incorporates a non-return valve 7.1. A coupling between the fixing section 3 and either the transport element or the container-treatment device provides the necessary pneumatic input. This pneumatic input is either a supply of compressed air or a source of vacuum.

Each holding section 4, 4' includes at least one chamber 4.1 that is coupled to the channel system 7. The radially-displaceable balls 5.1 couple to the chamber 4.1 in such a way that, when pressure is applied to the chamber 4.1, the radially-displaceable balls 5.1 move radially outward to clamp the container 2 into position after the respective section 4, 4' has been introduced through the container's mouth region 2.1.

Some embodiments also include a channel connection into the container's interior. This permits application of increased internal pressure into the container 2. In these embodiments, it is useful to increase clamping pressure at the container's mouth in the region of the holding sections 4, 4' to prevent the container 2 from being blown off. Such embodiments therefore include a gas restrictor 7.2 downstream of the chamber 4.1 or downstream of the channel section of the channel system 7 that leads to the chamber 4.1 and upstream of the outlet opening to the container's interior.

During the transfer by the conveyor, and hence, when leaving the coupling station, a non-return valve maintains the positive or negative pressure during the entire process until the subsequent release from the transport apparatus.

FIG. 4 shows a container treatment device 10 having a container inlet 11 that receives standing containers 2. A container feed 13 feeds containers in first and second rows. Containers in the first row remain standing upright as they enter a container treatment unit 15. Containers in the second row encounter a swivel mechanism 14. The swivel mechanism 14 swivels the containers into an upside-down position. As a result, containers in the second row enter the container-treatment unit 15 in an inverter, or upside-down orientation.

In some embodiments, the swivel mechanism 14 swivels the container about a pivot axis that is perpendicular to the container's vertical axis. The swivel mechanism 14 does so by gripping the container in the region of its container mouth. A suitable transport star wheel can carry out this swiveling as the container is being transported along its transport path.

As a result of the action of the container feed 13, a pair of containers enters the container-treatment unit 14 with their mouth regions facing one another. These containers are then attached to a holding-and-centering device 1, which holds them by their respective mouth regions 2.1. The pair of containers, which is now held by a holding-and-centering device 1, then passes through the container-treatment unit 15. It does so in such a way that the same holding-and-centering device 1 holds the same pair of containers throughout its journey through the whole container treatment unit 15.

In some embodiments, the container treatment unit 15 directly prints on containers. Among these embodiments are those in which the container treatment unit 15 is modular. In such embodiments, the container treatment unit 15 comprises plural modules that are immediately adjacent to one another along a transport direction. Each module is formed from an identical base unit that is equipped with functional elements required for the specific task to be carried out by that particular module. Examples of functional elements include print segments for printing containers 2, and curing devices for curing ink that has been applied to a container.

The individual modules are arranged immediately adjacent to one another and are driven synchronously in opposite directions. This enables the holding-and-centering device 1 to be easily transferred from one to the next. The totality of modules thus forms a conveyor that moves the containers 2 inside the container treatment unit 15 along a container transport path that has a plurality of deflections and on which the container treatment is effected. Since the holding-and-centering device 1 can be transferred from one module to the next, it is possible for one holding-and-centering device 1 to hold the same pair of containers 2 over the entire transport path through container treatment unit 15.

At the end of container treatment device 10, after the containers have been released from the holding-and-centering device 1, a further swivel mechanism 14 rotates the upside-down containers so that they are right-side up again. As a result, all the containers 2 will be conveyed away in with their container bases facing downward.

In some embodiments, the container treatment unit 15 uses inkjet printer heads to directly print on containers. In such cases, the container treatment unit 15 includes one or more transport elements, each of which has periphery that bears printing segments configured for container printing. FIG. 5 shows an example of a printing segment 20 engaged with a holding-and-centering device 1 that is holding a pair of containers 2.

The printing segment 20 comprises at least a first print head 21 and a second print head 22. Each of the first and second print heads 21, 22 is associated with a corresponding container 2 from the pair of containers. In the illustrated embodiment, the first print head 21 is in the upper region of the printing segment 20 and the second print head 22 is in the lower region of the printing segment 20.

Alternatively, the printing segment 20 features multiple groups of print heads, with each group of the print heads being associated with one container 2 of the pair of containers. In some embodiments, the first and second print heads 21, 22 are displaceable independently of one another along a direction that is parallel to a vertical machine axis. The ability to displace the first and second print heads 21, 22 makes it possible for each of the first and second print heads 21, 22 to print on any position on a container's wall.

A pick-up section 23 on the printing segment 20 matches a corresponding portion of the fixing section 3. This permits the holding-and-centering device 1 to engage the printing segment 20 at a particular position that is reproducible from one engagement to the next.

In some embodiments, one or more electromagnets can be at the printing segment 20 in the region of the pick-up section 23. By turning these electromagnets on and off, it becomes possible to hold and release the holding-and-centering device 1 at the printing segment 20.

In some embodiments, the printing segment 20 includes first and second stator coils 24, 25 that cooperate with the corresponding first and second rotor sections 6, 6' to form one or more electromagnetic direct drives. These electromagnetic drives rotate the containers 2 about their vertical container axes. As a result, it is possible to rotate the containers 2 relative to the corresponding first and second print heads 21, 22. This makes it possible for the print head to print anywhere on the wall of the containers 2.

In some embodiments, it is not necessary for both of the containers 2 of the pair of containers to rotate independently of one another. This may occur, for example, if the container feed 13 feeds pairs of containers in such a way that both containers have the same rotational alignment. In that case, only a single stator coil 24 is needed. This single stator coil 24 moves both containers 2 simultaneously.

The printing segment 20 also includes a fluid feed 26 for enabling pressurized fluid to pressurize the interiors of the containers 2. Doing so significantly improves the containers' stability during printing. An example of a pressurized fluid is compressed air. However, in some embodiments, the pressurized fluid is a sterile or sterilizing gaseous and/or vaporous medium.

In some embodiments, a pressure generator inside the printing segment 20 forms the fluid feed 26. In other embodiments, the fluid feed 26 is a fluid connection within the printing segment 20 that connects to a channel system 8 provided in the holding-and-centering device 1. This channel system 8 connects to a central source of pressurized fluid.

The channel system 8 includes a first channel 8.1 and second channels 8.2. The first channel 8.1 runs in the fixing section 3. This first channel 8.1 connects to the fluid feed 26. The second channels 8.2 connect the first channel 8.1 to the interior of the container. Each second channel 8.2 thus opens out into a container's interior.

The invention has been described with reference to particular embodiments. However, the scope of the invention is not limited by the embodiments but by the scope of the following attached claims.

The invention claimed is:

1. An apparatus comprising a holding-and-centering device for holding and centering a container, said holding-and-centering device comprising a fixing section, a first holding-section, and a second holding-section, wherein said fixing section enables said holding-and-centering device to be fixed to a structure of a container-treatment machine, said structure being selected from the group consisting of a treatment station and a transport element, wherein said first holding-section is configured to hold a first container, wherein said second holding-section is configured to hold a second container, wherein said first holding-section and said second holding-section are on opposite sides of said fixing section, and wherein said holding-and-centering device is detachable from said structure, said apparatus further comprising a source of pressurized fluid in fluid communication with an interior of at least one of said first and second containers.

2. The apparatus of claim 1, wherein each of said first and second holding sections comprises a clamp for clamping a corresponding one of said first and second containers in a mouth region thereof.

3. The apparatus of claim 1, further comprising a container transport path on which containers to be treated are moved in a transport direction from a container inlet to a container outlet, said container transport path being formed by at least one transport-and-treatment element that can be driven to rotate about a vertical machine axis and that has a plurality of treatment stations, wherein said holding-and-centering unit is one of a plurality of identical holding-and-centering units for at least one of holding, centering, aligning, and moving said containers at treatment stations during said treatment, wherein, as a result of their detachability, each of said holding-and-centering units is transferable, together with containers held thereon, from one transport-and-treatment element to a successive transport-and-treatment element.

4. An apparatus comprising a holding-and-centering device for holding and centering a container, said holding-and-centering device comprising a fixing section, a first holding-section, and a second holding-section, wherein said fixing section enables said holding-and-centering device to be fixed to a structure of a container-treatment machine, said structure being selected from the group consisting of a treatment station and a transport element, wherein said first holding-section is configured to hold a first container, wherein said second holding-section is configured to hold a second container, wherein said first holding-section and said second holding-section are on opposite sides of said fixing section, wherein said holding-and-centering device is detachable from said structure, wherein said first holding-section comprises a first axis-of-rotation for rotation of said first holding-section about said fixing section, wherein said second holding-section comprises a second axis-of-rotation for rotation of said second holding-section about said fixing section, and wherein said first axis-of-rotation is coincident with said second axis-of-rotation.

5. The apparatus of claim 4, wherein said first holding-section is rotatable relative to said fixing section and wherein said second holding-section is rotatable relative to said fixing section.

6. The apparatus of claim 4, wherein said fixing section is arranged between said first holding-section and said second holding-section.

7. The apparatus of claim 4, further comprising an electromagnetic direct drive and a rotor section, wherein said rotor is coupled to at least one of said first and second holding-sections, wherein, as a result of said rotor, at least one of said first and second holding-sections is configured to develop an angular velocity relative to said fixing section.

8. An apparatus comprising a holding-and-centering device for holding and centering a container, said holding-and-centering device comprising a fixing section, a first holding-section, and a second holding-section, wherein said fixing section enables said holding-and-centering device to be fixed to a structure of a container-treatment machine, said structure being selected from the group consisting of a treatment station and a transport element, wherein said first holding-section is configured to hold a first container, wherein said second holding-section is configured to hold a second container, wherein said first holding-section and said second holding-section are on opposite sides of said fixing section, wherein said holding-and-centering device is detachable from said structure, wherein said holding-and-centering device further comprises a first clamp, wherein, after said first holding-section has been pushed by a section into a mouth region of said first container, said first clamp fixes said first container, wherein, to fix said first container, said first clamp moves radially outward to apply a pressure to an internal periphery of a wall of said first container, said apparatus further comprising a second clamp that moves radially outward to apply a pressure to an internal periphery of a wall of said second container after said second holding-section has been pushed into a mouth region of said second container, and wherein, as a result, said second clamp fixes said second container.

9. The apparatus of claim 8, wherein said first clamp comprises a fluid-actuated clamp.

10. The apparatus of claim 8, wherein said first clamp comprises a spring-loaded clamp for clamping said first container at a mouth region thereof.

11. The apparatus of claim 8, wherein said first and second holding sections are configured to be pushed, at least by a section, through mouth regions of said first and second containers and into interiors of said first and second containers.

12. The apparatus of claim 8, wherein said first clamp comprises a pneumatic clamp, wherein said pneumatic clamp is a constituent of said first holding-section, and wherein said pneumatic clamp clamps a mouth region of said first container.

13. An apparatus comprising a holding-and-centering device for holding and centering a container, said holding-and-centering device comprising a fixing section, a first holding-section, and a second holding-section, wherein said fixing section enables said holding-and-centering device to be fixed to a structure of a container-treatment machine, said structure being selected from the group consisting of a treatment station and a transport element, wherein said first holding-section is configured to hold a first container, wherein said second holding-section is configured to hold a second container, wherein said first holding-section and said second holding-section are on opposite sides of said fixing section, wherein said holding-and-centering device is detachable from said structure, wherein said first holding-section is driven to engage in a first rotary-motion relative to said fixing section, wherein said second holding-section is driven to engage in a second rotary-motion relative to said fixing section, and wherein said first rotary-motion differs from said second rotary-motion in at least one of angular velocity and direction.

14. The apparatus of claim 13, further comprising a first rotor and a second rotor, wherein said first rotor is coupled to said first holding-section, wherein said second rotor is coupled to said second holding-section, wherein, as a result of said first rotor, said first holding-section is able to develop an angular velocity relative to said fixing section, wherein, as a result of said second rotor, said second holding-section is able to develop an angular velocity relative to said first holding-section, wherein, as a result of said second rotor, said second holding-section is able to develop an angular velocity relative to said fixing section, and wherein, as a result of said second rotor, said first holding-section is able to develop an angular velocity relative to said second holding-section, said apparatus further comprising an electromagnetic drive coupled to said first and second rotors.

15. The apparatus of claim 13, wherein said first and second holding sections comprise grippers.

16. An apparatus comprising a holding-and-centering device for holding and centering a container, said holding-and-centering device comprising a fixing section, a first holding-section, and a second holding-section, wherein said fixing section enables said holding-and-centering device to be fixed to a structure of a container-treatment machine, said structure being selected from the group consisting of a treatment station and a transport element, wherein said first holding-section is configured to hold a first container, wherein said second holding-section is configured to hold a second container, wherein said first holding-section and said second holding-section are on opposite sides of said fixing section, wherein said holding-and-centering device is detachable from said structure, and wherein said first and second holding sections are configured for holding said first and second containers in such a way that container mouths of said first and second containers face one another.

17. The apparatus of claim 16, wherein said first and second holding sections are driven together to rotate relative to said fixing section.

18. The apparatus of claim 16, further comprising a feeding apparatus, said feeding apparatus comprising a swivel mechanism configured to swivel a container about an axis perpendicular to a vertical container-axis of said container, and a container transport path on which containers to be treated are moved in a transport direction from a container inlet to a container outlet, said container transport path being formed by at least one transport-and-treatment element that can be driven to rotate about a vertical machine axis and that has a plurality of treatment stations, said holding-and-centering unit being one of a plurality of identical holding-and-centering units for at least one of aligning, centering, holding, and moving said containers at treatment stations during said treatment, wherein, as a result of their detachability, each of said holding-and-centering units is transferable, together with containers held thereon, from one transport-and-treatment element to a successive transport-and-treatment element, and wherein said feeding apparatus is configured such that that pairs of containers are fed to said holding-and-centering devices with mouth regions thereof facing each other.

19. The apparatus of claim 16, further comprising a container transport path on which containers to be treated are moved in a transport direction from a container inlet to a container outlet, said container transport path being formed by at least one transport-and-treatment element that can be driven to rotate about a vertical machine axis and that has a plurality of treatment stations, wherein said holding-and-centering unit is one of a plurality of identical holding-and-centering units for at least one of holding, centering, aligning, and moving said containers at treatment stations during said treatment, wherein, as a result of their detachability, each of said holding-and-centering units is transferable, together with containers held thereon, from one transport-and-treatment element to a successive transport-and-treatment element.

20. A method comprising treating containers, wherein treating container comprises moving said containers on a container-transport path, wherein moving said containers on a container-transport path comprises moving said containers from a container inlet along a path that leads from said container inlet toward a container outlet, wherein said container-transport path is formed by at least one transport-and-treatment element, wherein said at least one transport-and-treatment element is a transport-and-treatment element that is drivable to rotate about a vertical machine axis thereof, wherein said at least one transport-and-treatment comprises a plurality of treatment stations, said method comprising, during treatment of said containers, at least one of holding, centering, aligning, and moving said containers using holding-and-centering units, wherein at least one of holding, centering, aligning, and moving said containers using holding-and-centering units comprises using at least one of said holding-and-centering units to hold two containers that are to be treated so that said two container that are to be treated are lying opposite one another, wherein using at least one of said holding-and-centering units to hold two containers that are to be treated comprises using first and second holding sections that are arranged lying opposite one another, said method further comprising detaching holding-and-centering units from treatment stations at which said holding-and-centering units are detachably attached and transferring said holding-and-centering units to successive to corresponding subsequent treatment stations, wherein transferring said holding-and-centering units to successive to corresponding subsequent treatment stations comprises transferring said holding-and-centering units together with containers held by said holding-and-centering units.

* * * * *